(12) United States Patent
Nashimoto

(10) Patent No.: US 12,387,754 B2
(45) Date of Patent: Aug. 12, 2025

(54) HEAD DRIVING DEVICE

(71) Applicant: NHK SPRING CO., LTD., Yokohama (JP)

(72) Inventor: Gaku Nashimoto, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/640,280

(22) Filed: Apr. 19, 2024

(65) Prior Publication Data

US 2024/0386914 A1 Nov. 21, 2024

(30) Foreign Application Priority Data

May 15, 2023 (JP) ................................. 2023-079848

(51) Int. Cl.
*G11B 15/18* (2006.01)
*G11B 5/55* (2006.01)

(52) U.S. Cl.
CPC ........ *G11B 15/1883* (2013.01); *G11B 5/5504* (2013.01); *G11B 15/1808* (2013.01)

(58) Field of Classification Search
None
See application file for complete search history.

(56) References Cited

U.S. PATENT DOCUMENTS

| | | | | |
|---|---|---|---|---|
| 5,191,492 A * | 3/1993 | Nayak | ..................... | G11B 5/588 |
| 6,411,011 B1 * | 6/2002 | Takeuchi | ............. | H02N 2/0015 |
| | | | | 310/324 |
| 7,342,738 B1 * | 3/2008 | Anderson | ............... | G11B 5/584 |
| 7,474,495 B2 * | 1/2009 | Weng | .................... | G11B 5/5504 |
| | | | | 360/75 |
| 10,854,236 B1 * | 12/2020 | Harper | .................... | G11B 15/60 |
| 10,971,184 B1 | 4/2021 | Chew | | |
| 10,991,390 B2 | 4/2021 | Kobayashi | | |
| 11,393,498 B2 | 7/2022 | Kobayashi | | |
| 2006/0103968 A1 * | 5/2006 | Jurneke | .................. | G11B 5/584 |
| 2008/0198506 A1 * | 8/2008 | Weng | .................... | G11B 5/5504 |
| | | | | 360/101 |
| 2009/0116140 A1 * | 5/2009 | Harper | .................... | G11B 5/584 |
| | | | | 360/77.12 |
| 2015/0187379 A1 * | 7/2015 | Biskeborn | ................ | G11B 5/56 |
| | | | | 360/75 |
| 2017/0092312 A1 * | 3/2017 | Harper | ............... | G11B 5/00826 |
| 2019/0147910 A1 * | 5/2019 | Harper | ..................... | G11B 5/56 |
| | | | | 360/77.12 |

(Continued)

FOREIGN PATENT DOCUMENTS

JP 2020129424 A 8/2020

*Primary Examiner* — William J Klimowicz
(74) *Attorney, Agent, or Firm* — Holtz, Holtz & Volek PC

(57) ABSTRACT

A head driving device includes an actuator assembly driving a head member in a width direction of tape. The head driving device includes a first end support beam, a second end support beam, a first skew driving piezoelectric unit, and a second skew driving piezoelectric unit. The first end support beam is arranged between a first end portion of the head member in a length direction and a base member. The second end support beam is arranged between a second end portion of the head member in the length direction and the base member. The first skew driving piezoelectric unit and the second skew driving piezoelectric unit drive the head member around the Z-axis.

5 Claims, 9 Drawing Sheets

(56) References Cited

U.S. PATENT DOCUMENTS

| | | | | |
|---|---|---|---|---|
| 2021/0074323 A1* | 3/2021 | Harper | .................... | G11B 5/584 |
| 2021/0074330 A1* | 3/2021 | Harper | ............... | G11B 5/00817 |
| 2022/0415358 A1* | 12/2022 | Hanaoka | ................. | G11B 5/584 |
| 2023/0154490 A1* | 5/2023 | Hanya | .................. | G11B 5/5552 |
| | | | | 360/294.4 |
| 2024/0153534 A1* | 5/2024 | Hanya | .................. | G11B 5/4833 |
| 2024/0386907 A1* | 11/2024 | Kuwata | .................. | G11B 5/584 |
| 2024/0386908 A1* | 11/2024 | Arai | ..................... | G11B 5/4873 |

* cited by examiner

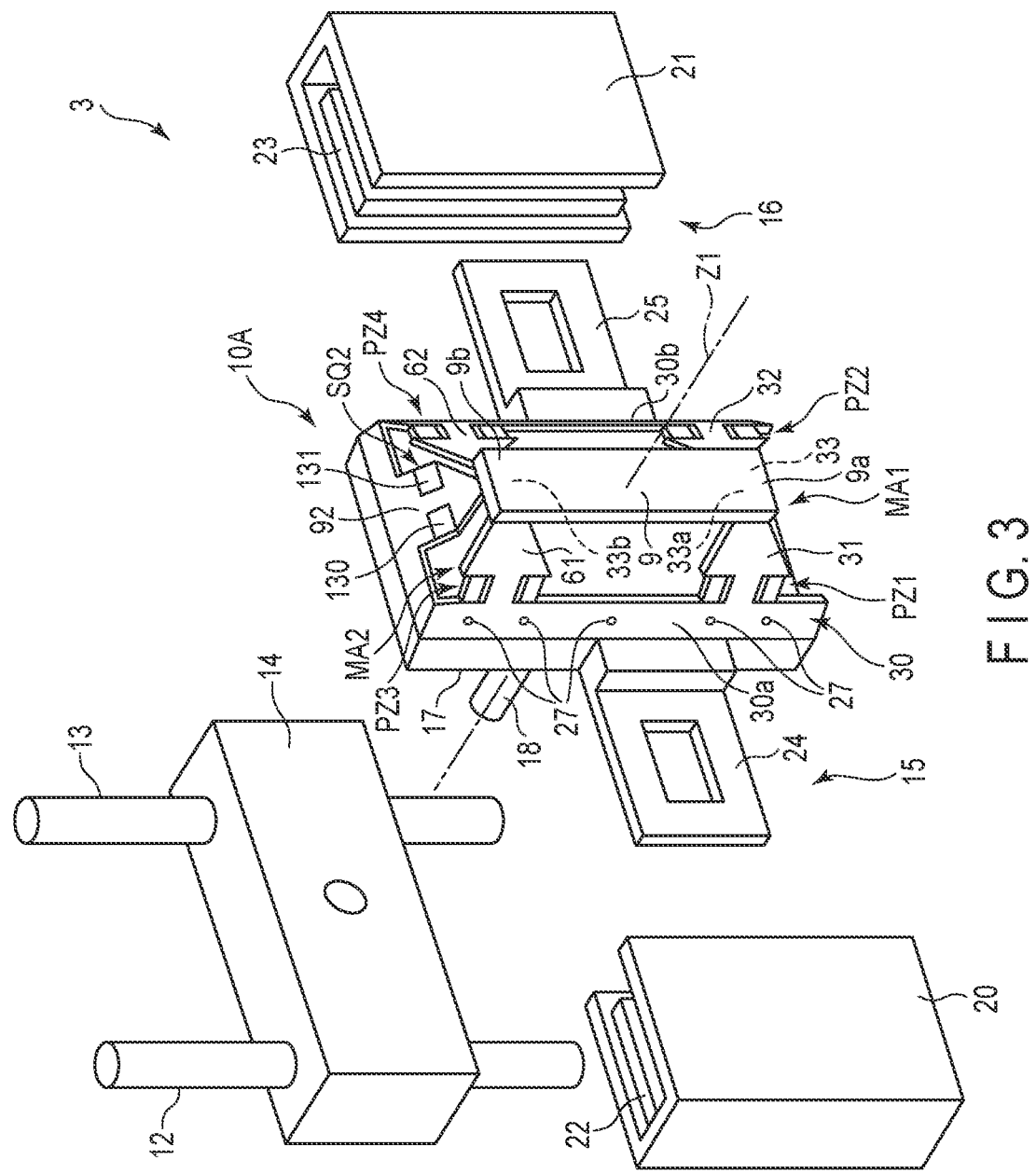
F I G. 3

HEAD DRIVING DEVICE

CROSS-REFERENCE TO RELATED APPLICATIONS

This application is based upon and claims the benefit of priority from prior Japanese Patent Application No. 2023-079848, filed May 15, 2023 the entire contents of which are incorporated herein by reference.

BACKGROUND OF THE INVENTION

1. Field of the Invention

The present invention relates to a head driving device of a data storage device using tape as a recording medium.

2. Description of the Related Art

Data storage devices which use tape (magnetic tape) as a recording medium are known. Examples of data storage devices are described in U.S. Pat. No. 10,971,184 B (Patent Literature 1) and JP 2020-129424 A (Patent Literature 2). Conventional data storage devices comprise a case, tape accommodated in the case, a tape winding mechanism, a head assembly, and the like. Data is magnetically recorded in the tape. The head assembly includes a magnetic head, a head driving device which relatively moves the magnetic head with respect to the tape, and the like. The magnetic head includes elements for performing access such as reading of data recorded in the tape and wiring of data.

The head driving device of the data storage device described in Patent Literature 1 includes a head stack assembly and a voice coil motor for moving the head stack assembly. A head arm including a spring function is provided at the distal end of the head stack assembly. A magnetic head is mounted on the head arm. The magnetic head moves in the width direction of the tape by the voice coil motor.

The head driving device of the data storage device described in Patent Literature 2 includes a coarse motion actuator and a micromotion actuator to handle the increase in the recording density of tape. The coarse motion actuator moves the magnetic head with a stroke which is relatively large. The micromotion actuator moves the magnetic head with a stroke which is relatively small. A stepping motor or a voice coil motor (VCM) is used for the coarse motion actuator. A piezoelectric element such as lead zirconate titanate (PZT) may be used for the micromotion actuator.

In the head driving device of Patent Literature 1, a small magnetic head moves in the width direction of the tape by the voice coil motor. In this type of conventional device, the tape may be damaged by contact with the magnetic head. In addition, in the conventional device, it is not easy to stably hold the magnetic head in a predetermined position with respect to the tape which moves at high speed. In another conventional device, a large magnetic head having a length corresponding to the width of tape may be used. However, the large magnetic head is heavy. Thus, it is difficult to stably support the magnetic head by a head arm having a suspension function.

The head driving device of Patent Literature 2 comprises the coarse actuator consisting of a voice coil motor, and the micromotion actuator consisting of a piezoelectric element. This type of conventional device has some problems. For example, the structure is complicated, and the number of components is increased.

In the case of hard disk drives using a disk as a recording medium, an air bearing is formed between the surface of the disk and a magnetic head. In the head driving device of Patent Literature 2, tape is used as a recording medium. The head driving device of Patent Literature 2 has the configuration in which the tape is not in contact with the magnetic head, in order to prevent the damage of the tape when the tape is fast wound or fast rewound. However, in this conventional device, the structure of the head driving device is further complicated.

In order to prevent the structure of the head driving device from being complicated, the inventors of the present application has conceived to support the magnetic head by a plurality of beam members on which piezoelectric elements are mounted. This head driving device drives the head in the width direction of tape (a tape track direction) by driving the beam member with the piezoelectric elements. However, the head member is desired to be moved in the skew direction depending on an access condition of the head member relative to the tape. The skew direction is a direction in which the head member moves around the orthogonal axis extending in the thickness direction of the head member.

An object of one embodiment is to provide a head driving device which can drive a head member in the skew direction.

BRIEF SUMMARY OF THE INVENTION

One embodiment relates to a head driving device moving a head member relative to tape as a recording medium. This head driving device comprises a base member, a head supporting member, a first beam member, a second beam member, a first piezoelectric unit, a second piezoelectric unit, a first end support beam, and a first skew driving piezoelectric unit. The base member includes a first frame portion and a second frame portion. The head supporting member supports the head member.

The first beam member is arranged between the first frame portion and one side portion of the head supporting member. The first beam member includes a first base portion and a first head side hinge portion. The first base portion is connected to the first frame portion. The first head side hinge portion is connected to the one side of the head supporting member. The second beam member is arranged between the second frame portion and the other side portion of the head supporting member. The second beam member includes a second base portion and a second head side hinge portion. The second base portion is connected to the second frame portion. The second head side hinge portion is connected to the other side portion of the head supporting member.

The first piezoelectric unit is arranged on the first beam member. The first piezoelectric unit comprises a piezoelectric element. When being applied with a voltage, this piezoelectric element drives the head supporting member in the width direction of the tape. The second piezoelectric unit comprises a piezoelectric element. When being applied with a voltage, this piezoelectric element drives the head supporting member in the width direction of the tape. The first end support beam is arranged between a first end portion of the head supporting member in the length direction and the base member. The first skew driving piezoelectric unit comprises piezoelectric elements. As an example, when being applied with a voltage, the piezoelectric elements drive the head supporting member in the skew direction.

The head driving device of the present embodiment can move the head supporting member in the skew direction. The first end support beam and the second end support beam can support an end portion of the head member.

The first skew driving piezoelectric unit may comprise a pair of piezoelectric elements arranged in the width direction of the head member. The head driving device of the present embodiment may further comprise a second end support beam and a second skew driving piezoelectric unit. The second end support beam is arranged between a second end portion of the head member in the length direction and the base member. The second skew driving piezoelectric unit includes piezoelectric elements arranged in the second end support beam. As an example, when being applied with a voltage, the piezoelectric elements move the head member in the skew direction. The second skew driving piezoelectric unit may comprise a pair of piezoelectric elements arranged in the width direction of the head member.

The head driving device of the present embodiment may comprise a reinforcement member. This reinforcement member is arranged between the second end portion of the head member in the length direction and the base member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is an exploded perspective view showing the driving assembly shown in FIG. 2.

DETAILED DESCRIPTION OF THE INVENTION

First Embodiment (FIG. 1 to FIG. 5)

This specification hereinafter describes an example of a data storage device comprising a head driving device 10A according to a first embodiment with reference to FIG. 1 to FIG. 5. A data storage device is not limited to an example shown in FIG. 1 and can be structured in various modes depending on the need.

Figure 1:
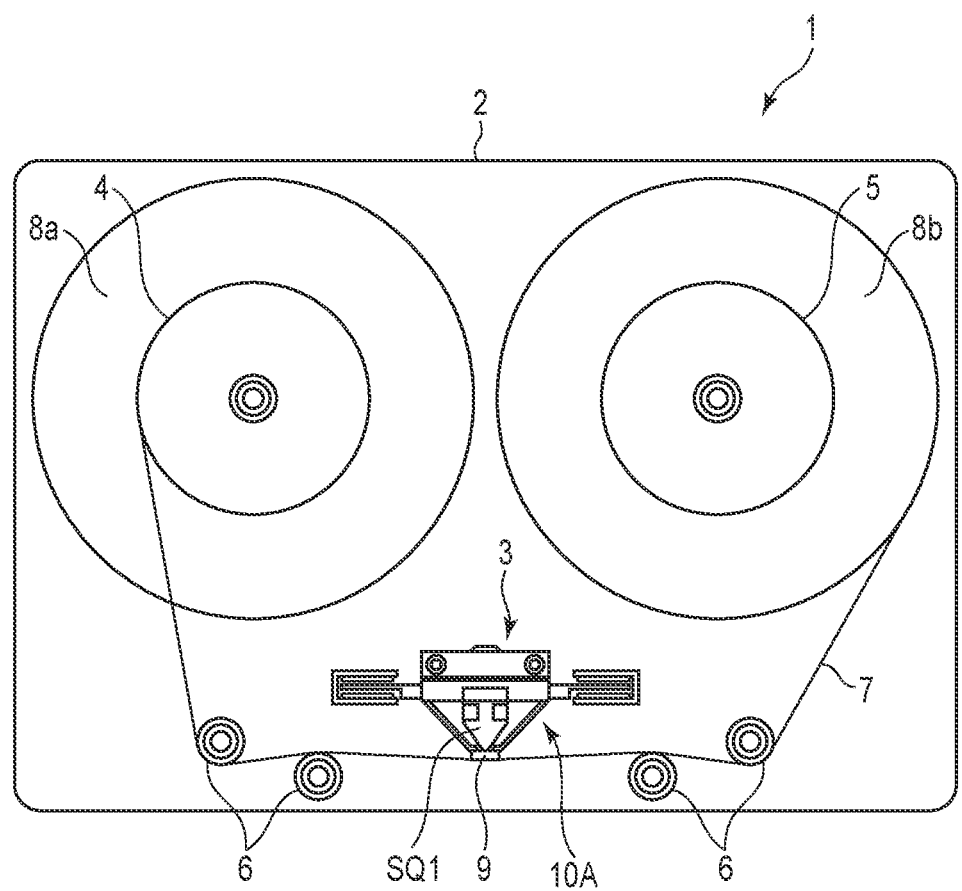
FIG. 1 is a front view schematically showing a data storage device comprising a head driving device of a first embodiment.

FIG. 1 is a front view schematically showing a data storage device 1 comprising the head driving device 10A. The data storage device 1 includes a case 2, a driving assembly 3, a first winding device 4, a second winding device 5, and a plurality of guide rollers 6. Tape 7 as a recording medium is wound around tape reels 8a and 8b. A head member 9 as a magnetic head is provided on the driving assembly 3.

The driving assembly 3 has a function of moving the head member 9 in the width direction of the tape 7 and a skew direction. The head member 9 extends in the width direction of the tape 7 (indicated by the two-headed arrow W1 in FIG. 4). Elements which can convert a magnetic signal into an electric signal such as an MR (Magneto Resistive) element are provided in the head member 9. By these elements, access such as data writing or reading with respect to the tape 7 is performed. The head member 9 may be referred to as a head bar or a slider.

Figure 2:
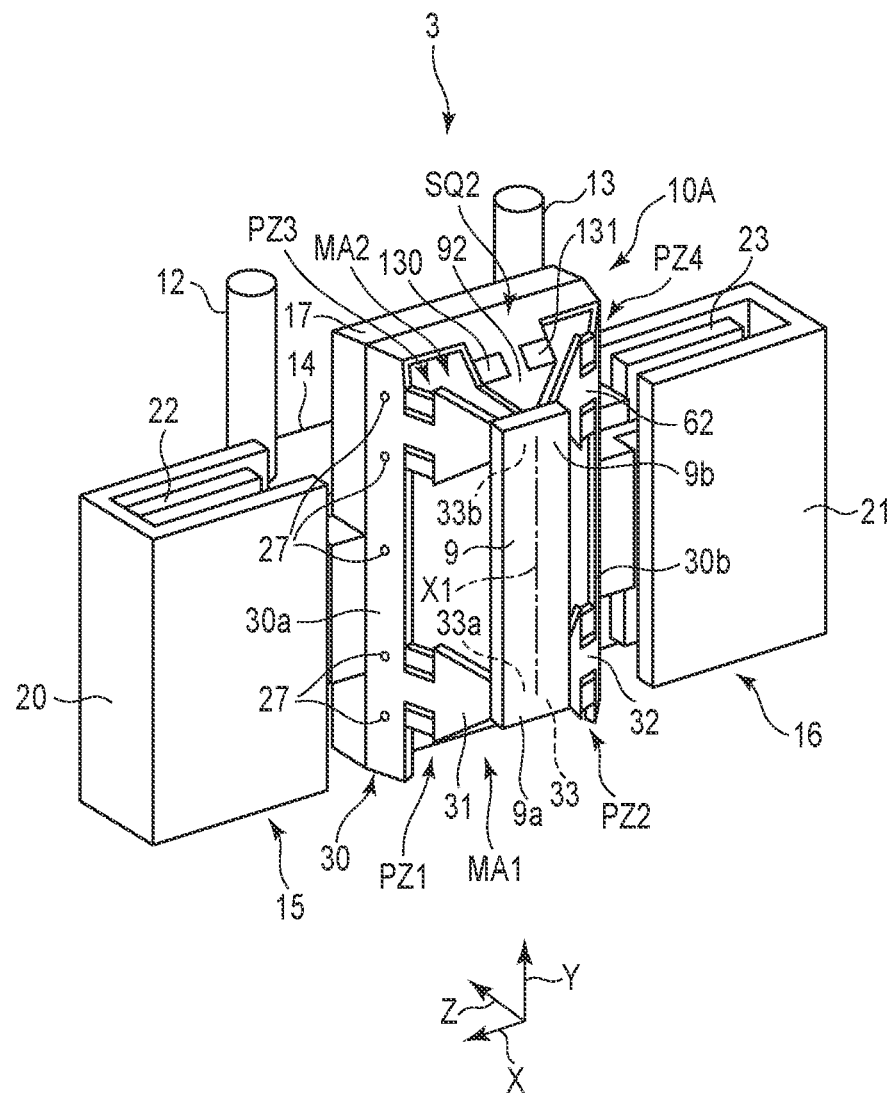
FIG. 2 is a perspective view of a driving assembly of the data storage device shown in FIG. 1.

FIG. 2 shows an example of the driving assembly 3. FIG. 3 is an exploded perspective view showing the driving assembly 3. The driving assembly 3 includes the head driving device 10A. The driving assembly 3 includes a slide member 14, coarse voice coil motors 15 and 16, and a base member 17. The slide member 14 can move along a pair of guide members 12 and 13. The voice coil motors 15 and 16 move the slide member 14. The base member 17 is provided on the slide member 14.

As shown in FIG. 2 and FIG. 3, the head driving device 10A is arranged on the slide member 14. The base member 17 can be pivoted about a skew axis 18 (shown in FIG. 3). In this specification, for convenience of description, the width direction of the head member 9 is referred to as the X-axial direction (shown in FIG. 2 and FIG. 5). The length direction of the head member 9 is referred to as the Y-axial direction, and the thickness direction of the head member 9 is referred to as the Z-axial direction. The Y-axial direction is also the width direction of the tape 7 (referred to as a tape track direction as well).

The pair of voice coil motors 15 and 16 respectively comprise yokes 20 and 21, magnets 22 and 23, and coils 24 and 25. The voice coil motors 15 and 16 move the slide member 14 and the base member 17 along the guide portions 12 and 13. The voice coil motors 15 and 16 rotate the base member 17 and the head driving device 10A around the skew axis 18.

Figure 4:
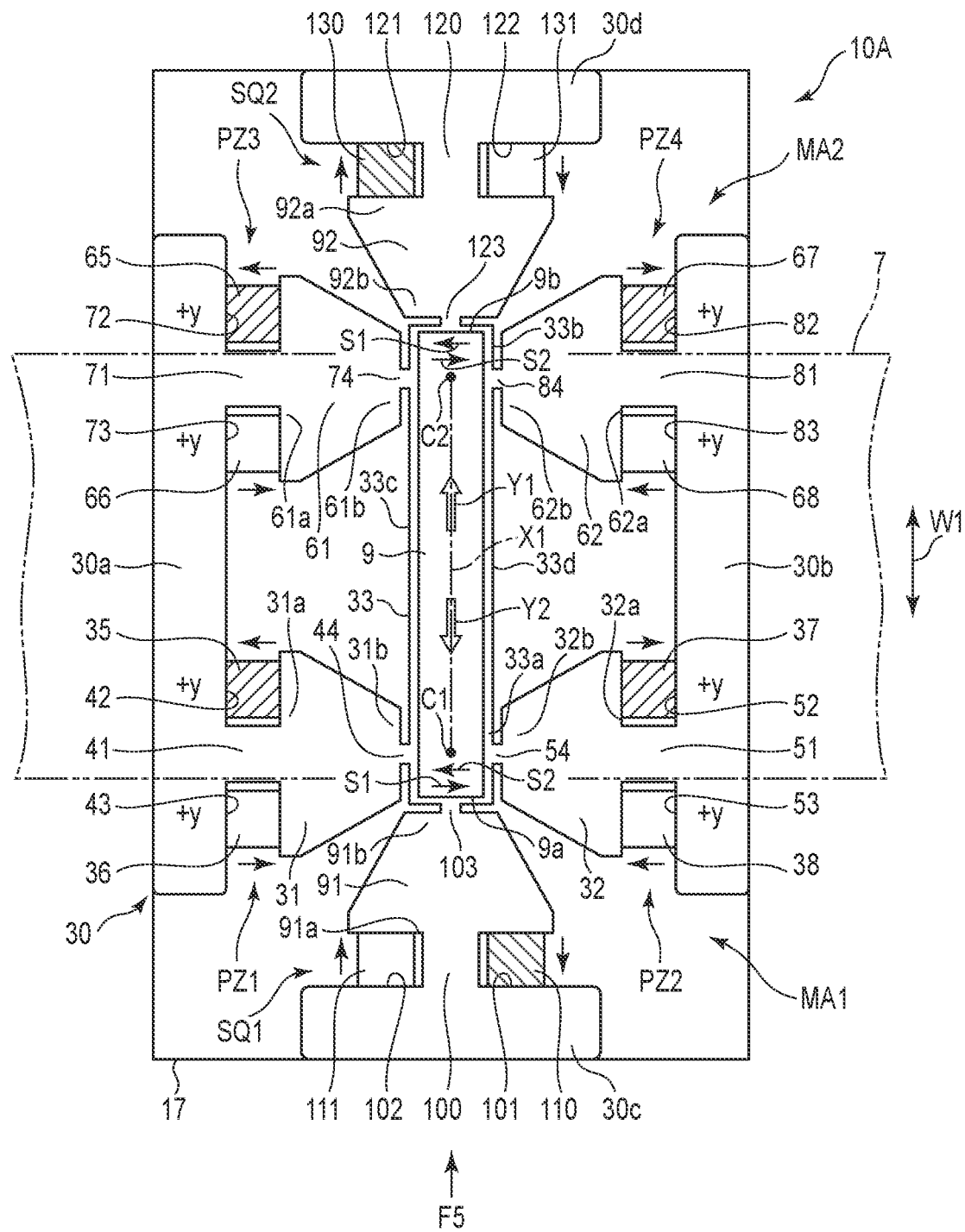
FIG. 4 is a plan view of a head driving device of the driving assembly shown in FIG. 2.

FIG. 4 is a plan view of the head driving device 10A. The head driving device 10A comprises a frame structure 30, a first actuator assembly MA1, and a second actuator assembly MA2. The frame structure 30 constitutes a part of the base member 17. The first actuator assembly MA1 is located on the lower side in FIG. 4. The second actuator assembly MA2 is located on the upper side in FIG. 4. The first actuator assembly MA1 and the second actuator assembly MA2 have substantially common configurations.

The frame structure 30 is a part of the base member 17. The frame structure 30 includes a first frame portion 30a located on the left side in FIG. 4 and a second frame portion 30b on the right side in FIG. 4. The first frame portion 30a and the second frame portion 30b extend in directions parallel to each other. The first frame portion 30a is fixed to a side portion of the base member 17 by a fixing portion 27 (shown in FIG. 2 and FIG. 3) such as a thread member or an adhesive. The second frame portion 30b is fixed to the other side portion of the base member 17 by the same fixing portion. The first frame portion 30a and the second frame portion 30b may be connected to each other. The first frame portion 30a and the second frame portion 30b may be separated from each other.

First, the first actuator assembly MA1 will be described below.

The first actuator assembly MA1 includes a first beam member 31, a second beam member 32, a first portion 33a of a head supporting member 33, and four piezoelectric elements 35, 36, 37, and 38. The piezoelectric elements 35, 36, 37, and 38 are constituted by piezoelectric bodies have a property of deforming when being applied with a voltage, for example, PZT.

As shown in FIG. 4, the head member 9 includes a first end portion 9a in the length direction and a second end portion 9b in the length direction. Axis X1 of the head member 9 extends in the length direction of the head member 9 through center C1 of the first portion 33a of the head supporting member 33. The first beam member 31 and the second beam member 32 are substantially line-symmetric to each other with respect to axis X1.

The first beam member 31 and the second beam member 32 extend in a direction orthogonal to axis X1. The first portion 33a of the head supporting member 33 supports the first end portion 9a of the head member 9. The first end portion 9a of the head member 9 is fixed to the first portion 33a of the head supporting member 33 by a fixing means such as an adhesive.

The first beam member 31 extends from the first frame portion 30a to the first portion 33a of the head supporting member 33. The second beam 32 is provided on a side opposite to the first beam member 31 with the first portion 33a of the head supporting member 33 interposed therebetween. The second beam member 32 extends from the second frame portion 30b to the first portion 33a of the head supporting member 33. The first beam member 31 and the second beam member 32 are formed of, for example, a stainless-steel plate.

As shown in FIG. 4, the first beam member 31 has a tapered shape in which the width decreases from a first base portion 31a to a distal end 31b. A first base side hinge portion 41 is formed between the first base portion 31a and the first frame portion 30a. On both sides of the base side hinge portion 41, a pair of element accommodation portions 42 and 43 consisting of a recess are formed. A first head side hinge portion 44 having a narrowed width is provided between the distal end 31b of the first beam member 31 and the first portion 33a of the head supporting member 33. The first head side hinge portion 44 is connected to one side 33c of the head supporting member 33.

The element accommodation portions 42 and 43 are formed between the first frame portion 30a and the first beam member 31. The piezoelectric elements 35 and 36 are accommodated in the element accommodation portions 42 and 43, respectively. The piezoelectric element 35 indicated by the hatching in FIG. 4 is accommodated in the element accommodation portion 42. The piezoelectric element 35 is accommodated in the element accommodation portion 42 with a predetermined polarity so as to expand or contract based on the polarity (plus or minus) of the applied voltage. The piezoelectric element 36 is accommodated in the element accommodation portion 43 such that it faces the opposite direction of the piezoelectric element 35 thereby having the opposite polarity of the piezoelectric element 35.

The piezoelectric elements 35 and 36 provided on the first beam member 31 constitute a first piezoelectric unit PZ1. When the piezoelectric element 35 contracts by the application of a voltage and the piezoelectric element 36 expands, the distal end 31b of the first beam member 31 is displaced in a first direction (shown by arrow Y1 in FIG. 4). When the piezoelectric element 35 expands and the piezoelectric element 36 contracts, the distal end 31b of the first beam member 31 is displaced in a second direction (shown by arrow Y2 in FIG. 4). That is, the first piezoelectric unit PZ1 moves the head supporting member 33 in the width direction of the tape 7 (length direction of the head member 9) in a state where the first piezoelectric unit PZ1 is applied with a voltage.

The second beam member 32 has a tapered shape in which the width decreases from a second base portion 32a to a distal end 32b. A second base side hinge portion 51 is formed between the second base portion 32a and the second frame portion 30b. On both sides of the second base side hinge portion 51, a pair of element accommodation portions 52 and 53 consisting of a recess are formed. A second head side hinge portion 54 having a narrowed width is provided between the distal end 32b of the second beam member 32 and the first portion 33a of the head supporting member 33. The second head side hinge portion 54 is connected to the side portion 33d of the head supporting member 33.

The element accommodation portions 52 and 53 are formed between the second frame portion 30b and the second beam member 32. The piezoelectric elements 37 and 38 are accommodated in the element accommodation portions 52 and 53, respectively. The piezoelectric element 37 indicated by the hatching in FIG. 4 is accommodated in the element accommodation portion 52. The piezoelectric element 37 is accommodated in the element accommodation portion 52 with a predetermined polarity so as to expand or contract based on the polarity (plus or minus) of the applied voltage. The piezoelectric element 38 is accommodated in the element accommodation portion 53 such that it faces the opposite direction of the piezoelectric element 37 thereby having the opposite polarity of the piezoelectric element 37.

The piezoelectric elements 37 and 38 provided on the second beam member 32 constitute a second piezoelectric unit PZ2. When the piezoelectric element 37 contracts by the application of a voltage and the piezoelectric element 38 expands, the distal end 32b of the second beam member 32 is displaced in the first direction (shown by arrow Y1 in FIG. 4). When the piezoelectric element 37 expands by the application of a voltage and the piezoelectric element 38 contracts, the distal end 32b of the second beam member 32 is displaced in the second direction (shown by arrow Y2 in FIG. 4).

That is, the second piezoelectric unit PZ2 moves the head supporting member 33 in a width direction of the tape 7 (length direction of the head member 9) in a state where the second piezoelectric unit PZ2 is applied with a voltage. The head member 9 moves in the tape track direction (first direction Y1 or second direction Y2) by the second beam member 32 displacing in the same direction as that of the first beam member 31.

Figure 5:
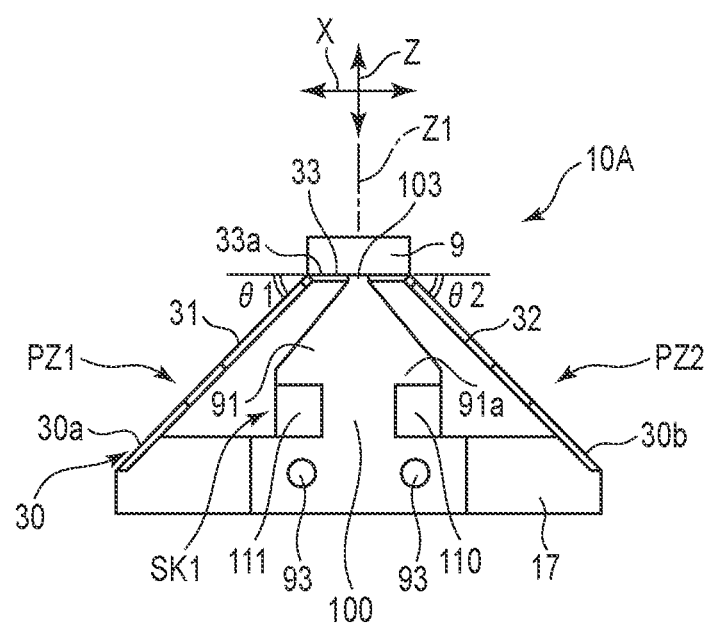
FIG. 5 is a front view in which the head driving device shown in FIG. 4 is viewed in the direction shown by arrow F5 in FIG. 4.

FIG. 5 is a front view in which the head driving device 10A is viewed in the direction shown by arrow F5 in FIG. 4. The first beam member 31 is bent with respect to the first portion 33a of the head supporting member 33 at an angle θ1 smaller than 90° (for example,) 45°. The second beam member 32 is bent with respect to the first portion 33a of the head supporting member 33 at an angle θ2 smaller than 90° (for example, 45°).

As shown in FIG. 3 and FIG. 5, the orthogonal axis Z1 extends in the thickness direction of the head member 9. The orthogonal axis Z1 passes through the center of the head member 9 and extends in the same direction as the Z-axial direction. In addition, this orthogonal axis Z1 is located on an extension line of the skew axis 18 (shown in FIG. 3). Thus, the head member 9 can move in the skew direction around the orthogonal axis Z1.

Next, the second actuator assembly MA2 will be described below.

The second actuator assembly MA2 includes a third beam member 61 located on the left side in FIG. 4 and a fourth beam member 62 located on the right side in FIG. 4. This actuator assembly MA2 includes a second portion 33b of the head supporting member 33 and four piezoelectric elements 65, 66, 67, and 68. The piezoelectric elements 65, 66, 67, and 68 are constituted by piezoelectric bodies have a property of deforming when being applied with a voltage, for example, PZT.

As shown in FIG. 4, a third beam member 61 and a fourth beam member 62 are substantially line-symmetric to each other. The second end portion 33b of the head supporting member 33 supports the second end portion 9b of the head member 9. The second end portion 9b of the head member 9 is fixed to the second portion 33b of the head supporting member 33 by a fixing means such as an adhesive.

The third beam member 61 extends from the first frame portion 30a to the second portion 33b of the head supporting member 33. The fourth beam member 62 is provided on a side opposite to the third beam member 61 with the second portion 33b of the head supporting member 33 interposed therebetween. The fourth beam member 62 extends from the second frame portion 30b to the second portion 33b of the head supporting member 33. The third beam member 61 and the fourth beam member 62 are formed of, for example, a stainless-steel plate. Axis X1 of the head member 9 passes through center C2 (shown in FIG. 4) of the second portion 33b of the head supporting member 33.

As shown in FIG. 4, the third beam member 61 has a tapered shape in which the width decreases from a third base portion 61a to a distal end 61b. A third base side hinge portion 71 is formed between the third base portion 61a and the first frame portion 30a. On both sides of the third base side hinge portion 71, a pair of element accommodation portions 72 and 73 consisting of a recess are formed. A third head side hinge portion 74 having a narrowed width is provided between the distal end 61b of the third beam member 61 and the second portion 33b of the head supporting member 33. The third head side hinge portion 74 is connected to one side 33c of the head supporting member 33.

The element accommodation portions 72 and 73 are formed between the first frame portion 30a and the third beam member 61. The piezoelectric elements 65 and 66 are accommodated in the element accommodation portions 72 and 73, respectively. The piezoelectric element 65 indicated by the hatching in FIG. 4 is accommodated in the element accommodation portion 72.

The piezoelectric element 65 is accommodated in the element accommodation portion 72 with a predetermined polarity so as to expand or contract based on the polarity of the applied voltage. The piezoelectric element 66 is accommodated in the element accommodation portion 73 such that it faces the opposite direction of the piezoelectric element 65 thereby having the opposite polarity of the piezoelectric element 65.

The piezoelectric elements 65 and 66 provided on the third beam member 61 constitute a third piezoelectric unit PZ3. When the piezoelectric element 65 contracts by the application of a voltage and the piezoelectric element 66 expands, the distal end 61b of the third beam member 61 is displaced in the first direction (shown by arrow Y1 in FIG. 4). When the piezoelectric element 65 expands by the application of a voltage and the piezoelectric element 66 contracts, the distal end 61b of the third beam member 61 is displaced in the second direction (shown by arrow Y2 in FIG. 4).

The fourth beam member 62 has a tapered shape in which the width decreases from a fourth base portion 62a to a distal end 62b. A fourth base side hinge portion 81 is formed between the fourth base portion 62a and the second frame portion 30b. On both sides of the fourth base side hinge portion 81, a pair of element accommodation portions 82 and 83 consisting of a recess are formed. A fourth head side hinge portion 84 having a narrowed width is provided between the distal end 62b of the fourth beam member 62 and the second portion 33b of the head supporting member 33. The fourth head side hinge portion 84 is connected to the side portion 33d of the head supporting member 33.

The first frame portion 30a, the first beam member 31, and the third beam member 61 may be formed of an integral metal plate. The second frame portion 30b, the second beam member 32, and the fourth beam member 62 may be formed of an integral metal plate.

The element accommodation portions 82 and 83 are formed between the second frame portion 30b and the fourth beam member 62. The piezoelectric elements 67 and 68 are accommodated in the element accommodation portions 82 and 83, respectively. The piezoelectric element 67 indicated by the hatching in FIG. 4 is accommodated in the element accommodation portion 82. The piezoelectric element 67 is accommodated in the element accommodation portion 82 with a predetermined polarity so as to expand or contract based on the polarity of the applied voltage. The piezoelectric element 68 is accommodated in the element accommodation portion 83 such that it faces the opposite direction of the piezoelectric element 67 thereby having the opposite polarity of the piezoelectric element 67.

The piezoelectric elements 67 and 68 provided on the fourth beam member 62 constitute a fourth piezoelectric unit PZ4. When the piezoelectric element 67 contracts by the application of a voltage and the piezoelectric element 68 expands, the distal end 62b of the fourth beam member 62 is displaced in the first direction (shown by arrow Y1 in FIG. 4). When the piezoelectric element 67 expands by the application of a voltage and the piezoelectric element 68 contracts, the distal end 62b of the fourth beam member 62 is displaced in the second direction (shown by arrow Y2 in FIG. 4). The second portion 33b of the head supporting member 33 moves in the width direction of the tape 7 (first direction Y1 or second direction Y2) by the fourth beam member 62 displacing the same direction as that of the third beam member 61 in this manner. Each of the first direction Y1 and the second direction Y2 is the tape track direction.

For example, when all of the piezoelectric elements 35 to 38 and 65 to 68 are applied with input voltages [+y], the piezoelectric elements 36, 38, 66, and 68 in the normal positions expand and the piezoelectric elements 35, 37, 65, and 67 in a reverse positions contract. Thus, the head member 9 moves in the first direction (shown by arrow Y1).

When all of the piezoelectric elements 35 to 38 and 65 to 68 are applied with input voltages [−y], the piezoelectric elements 36, 38, 66, and 68 in the normal positions contract and the piezoelectric elements 35, 37, 65, and 67 in a reverse positions expand. By this structure, the head member 9 moves in the second direction (the opposite of arrow Y1). Thus, it is possible to move the head member 9 in the Y-axial direction using an input signal [±y] of one system.

Similarly to the first beam member 31 shown in FIG. 5, the third beam member 61 is bent with respect to the head supporting member 33 at an angle θ1 (for example, 30°). Similarly to the second beam member 32 shown in FIG. 5, the fourth beam member 62 is bent with respect to the head supporting member 33 at an angle θ2 (for example, 30°).

The head driving device 10A further comprises a first end support beam 91, a second end support beam 92, a first skew driving piezoelectric unit SQ1, and a second skew driving piezoelectric unit SQ2. The first skew driving piezoelectric unit SQ1 and the second skew driving piezoelectric unit SQ2 have a function of driving the head member 9 around the orthogonal axis Z1 (skew direction).

The first end support beam 91 is arranged between the first end portion 9a of the head member 9 in the length direction and the base member 17. As shown in FIG. 4, the first end support beam 91 has a tapered shape in which the width decreases from a base portion 91a to a distal end 91b. A base side hinge portion 100 is formed on the base portion 91a. On both sides of the base side hinge portion 100, a pair of element accommodation portions 101 and 102 consisting of a recess are formed.

The base portion of the first end support beam 91 is fixed to the base member 17 by a fixing portion 93 such as a thread member or an adhesive. The head side hinge portion 103 having a narrowed width is arranged between the distal end 91b of the first end support beam 91 and the head supporting member 33. The distal end of the first end support beam 91, in other words, the head side hinge portion 103 is connected to one end of the head supporting member 33.

Piezoelectric elements 110 and 111 are accommodated in the element accommodation portions 101 and 102, respectively. The piezoelectric element 110 indicated by the hatching in FIG. 4 is accommodated in the element accommodation portion 101. The piezoelectric element 110 is accommodated in the element accommodation portion 101 with a predetermined polarity so as to expand or contract based on the polarity of the applied voltage. The piezoelectric element 111 is accommodated in the element accommodation portion 102. The piezoelectric element 111 is accommodated in the element accommodation portion 102 such that it faces the opposite direction of the piezoelectric element 110 thereby having the opposite polarity of the piezoelectric element 110.

The pair of piezoelectric elements 110 and 111 provided on the first end support beam 91 constitute the first skew driving piezoelectric unit SQ1. When the piezoelectric element 110 contracts by the application of a voltage and the piezoelectric element 111 expands, the distal end 91b of the first end support beam 91 is displaced in a first skew direction (shown by arrow S1 in FIG. 4).

When the piezoelectric element 110 expands by the application of a voltage and the piezoelectric element 111 contracts, the distal end 91b of the first end support beam 91 is displaced in a second skew direction (shown by arrow S2 in FIG. 4). When being applied with a voltage, the first skew driving piezoelectric unit SQ1 drives the head member 9 around the orthogonal axis Z1.

The second end support beam 92 is arranged between the second end portion 9b of the head member 9 and the base member 17. As shown in FIG. 4, the second end support beam 92 has a tapered shape in which the width decreases from a base portion 92a to a distal end 92b. A base side hinge portion 120 is formed between the base portion 92a and the frame portion 30d. On both sides of the base side hinge portion 120, a pair of element accommodation portions 121 and 122 consisting of a recess are formed.

A base portion of the second end support beam 92 is fixed to the base member 17 by a fixing portion that is the same fixing portion 93 of the first end support beam 91. A head side hinge portion 123 having a narrowed width is arranged between the distal end 92b of the second end support beam 92 and the head supporting member 33. The distal end of the second end support beam 92, in other words, the head side hinge portion 123 is connected to the other end of the head supporting member 33.

Piezoelectric elements 130 and 131 are accommodated in the element accommodation portions 121 and 122, respectively. The piezoelectric element 130 indicated by the hatching in FIG. 4 is accommodated in the element accommodation portion 121. The piezoelectric element 130 is accommodated in the element accommodation portion 121 with a predetermined polarity so as to expand or contract based on the polarity of the applied voltage. The piezoelectric element 131 is accommodated in the element accommodation portion 122. The piezoelectric element 131 is accommodated in the element accommodation portion 122 such that it faces the opposite direction of the piezoelectric element 130 thereby having the opposite polarity of the piezoelectric element 130.

The pair of piezoelectric elements 130 and 131 provided on the second end support beam 92 constitute the second skew driving piezoelectric unit SQ2. When the piezoelectric element 130 contracts by the application of a voltage and the piezoelectric element 131 expands, the distal end 92b of the second end support beam 92 is displaced in the first skew direction (shown by arrow S1 in FIG. 4).

When the piezoelectric element 130 expands by the application of a voltage and the piezoelectric element 131 contracts, the distal end 92b of the second end support beam 92 is displaced in the second skew direction (shown by arrow S2 in FIG. 4). That is, the second skew driving piezoelectric unit SQ2 drives the head member 9 around the orthogonal axis Z1 in the same rotational direction of the first skew driving piezoelectric unit SQ1, when being applied with a voltage.

As described above, the head driving device 10A of the present embodiment can move the head member 9 in the width direction of the tape 7 by the first actuator assembly MA1 and the second actuator assembly MA2. In addition, the first skew driving piezoelectric unit SQ1 and the second skew driving piezoelectric unit SQ2 can move the head member 9 in the skew direction as well.

In the head driving device 10A of the present embodiment, the first end support beam 91 supports the first end portion 9a of the head member 9 on the base member 17. The second end support beam 92 supports the second end portion 9b of the head member 9 on the base member 17. Thus, the head member 9 can stably support the head member 9 when being vibrated by the actuator assemblies MA1 and MA2 and thus increase the vibration property.

Figure 6:
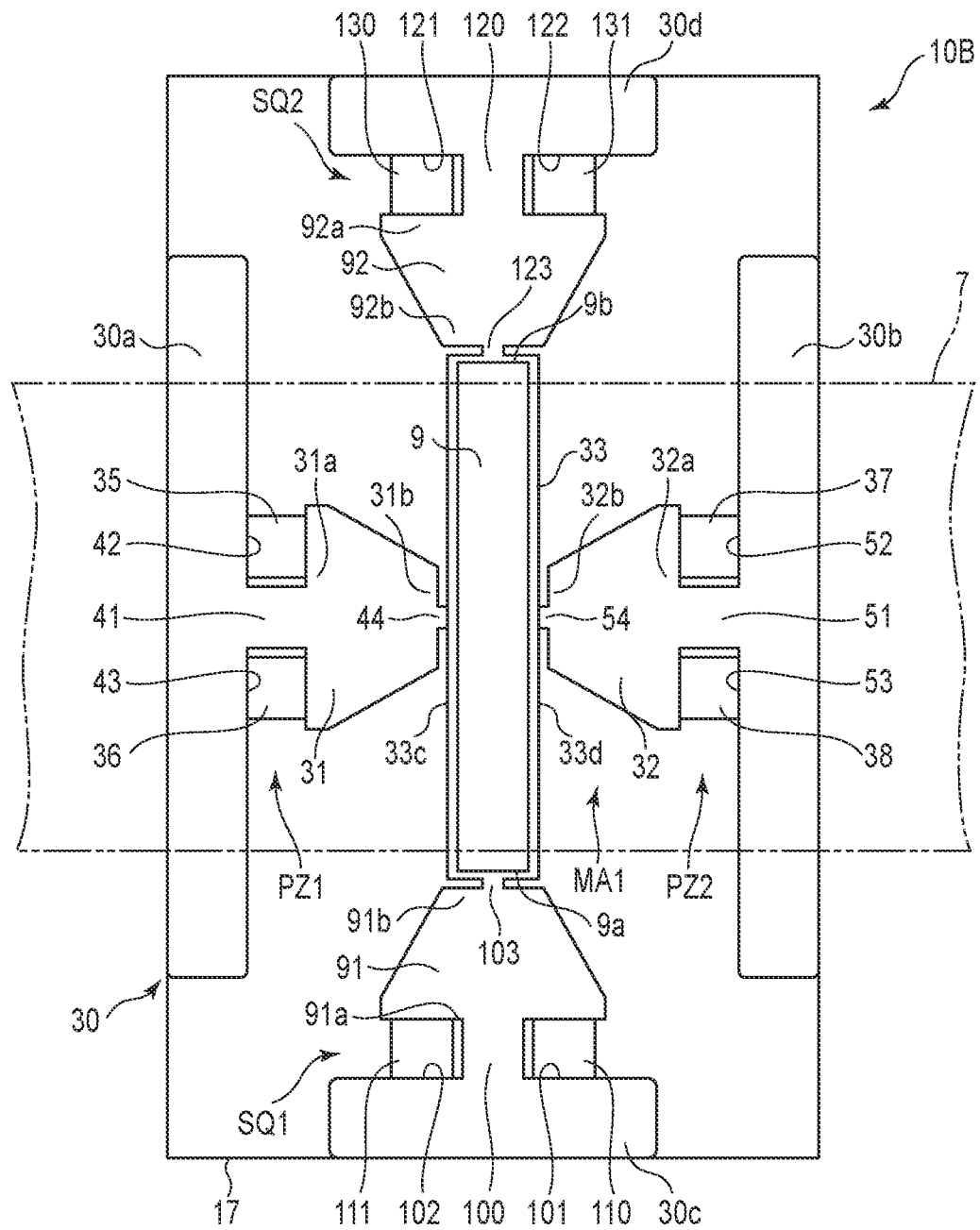
FIG. 6 is a plan view of a head driving device of a second embodiment.

Second Embodiment (FIG. 6)

FIG. 6 is a plan view of a head driving device 10B of a second embodiment. This head driving device 10B includes a first actuator assembly MA1, a first skew driving piezoelectric unit SQ1, and a second skew driving piezoelectric unit SQ2. The head driving device 10B of the second embodiment is different from the first embodiment in not including a second actuator assembly MA2.

A first beam member 31 of the head driving device 10B is arranged between the center portion of a head member 9 in the length direction and a first frame portion 30a. A second beam member 32 is arranged between the center portion of the head member 9 in the length direction and a second frame portion 30b. Since the other structures are common to the head driving device 10A of the first embodiment and the head driving device of the present embodiment, explanations thereof are omitted by adding common reference numbers to common structural elements.

Figure 7:
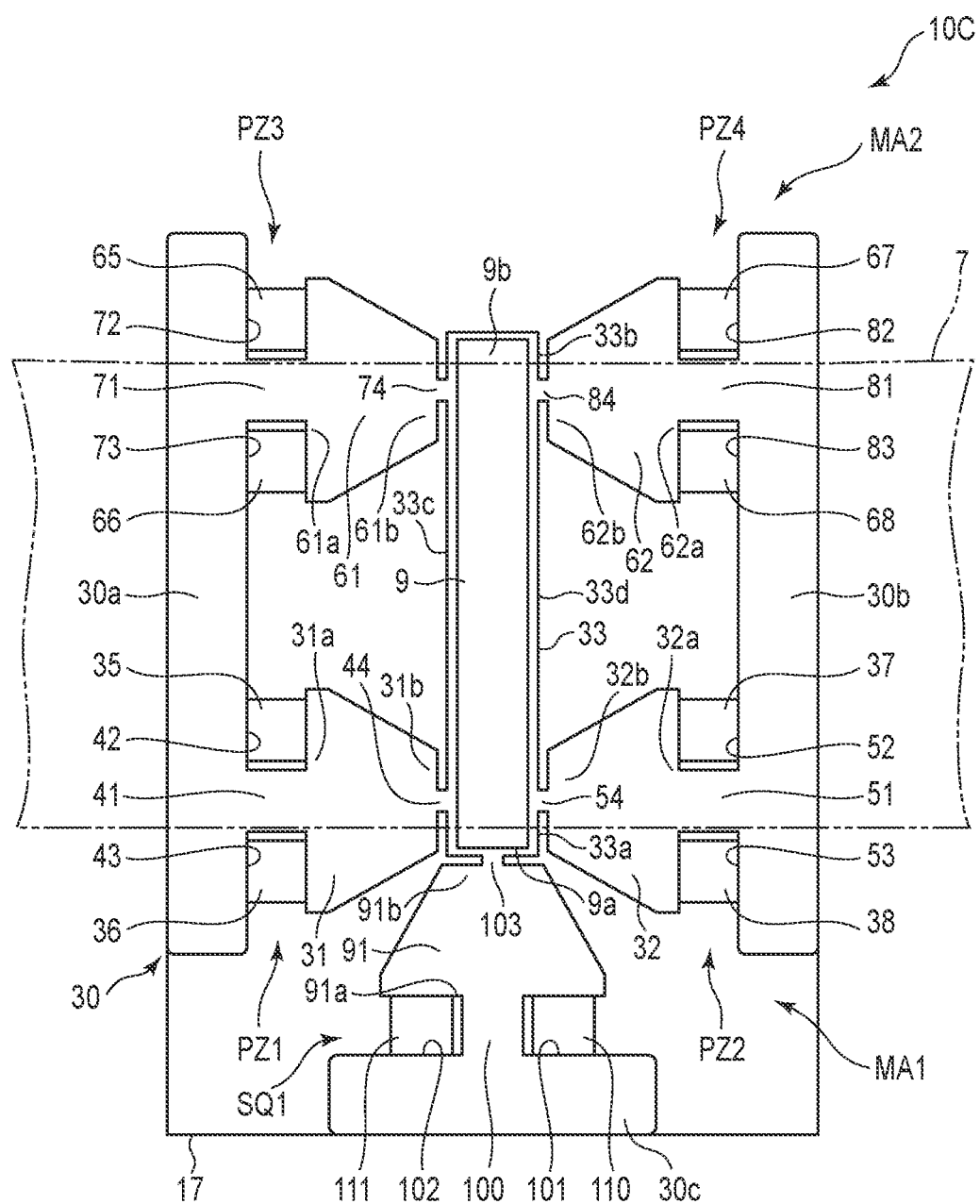
FIG. 7 is a plan view of a head driving device of a third embodiment.

Third Embodiment (FIG. 7)

FIG. 7 is a plan view of a head driving device 10C of a third embodiment. This head driving device 10C includes a first actuator assembly MA1, a second actuator assembly MA2, and a first skew driving piezoelectric unit SQ1. The first skew driving piezoelectric unit SQ1 is arranged between a first end portion 9a of a head member 9 and a base member 17. The head driving device 10C of the third embodiment is different from the first embodiment in not including the second skew driving piezoelectric unit SQ2. Since the other structures are common to the head driving device 10A of the first embodiment and the head driving device of the present embodiment, explanations thereof are omitted by adding common reference numbers to common structural elements.

Figure 8:
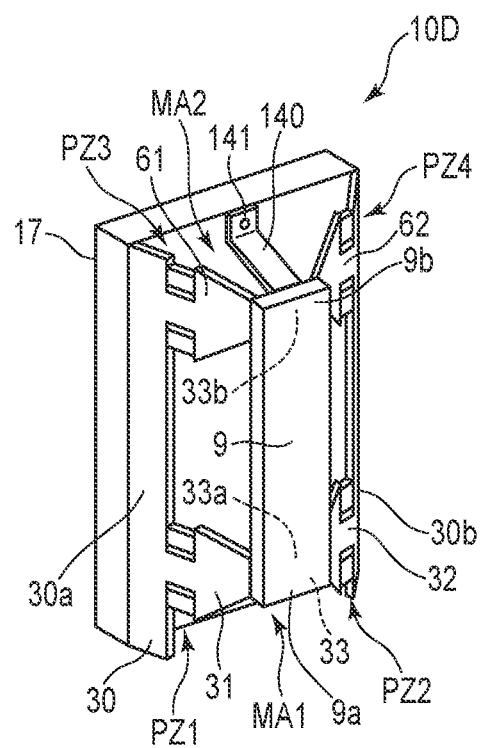
FIG. 8 is a perspective view of a head driving device of a fourth embodiment.
Figure 9:
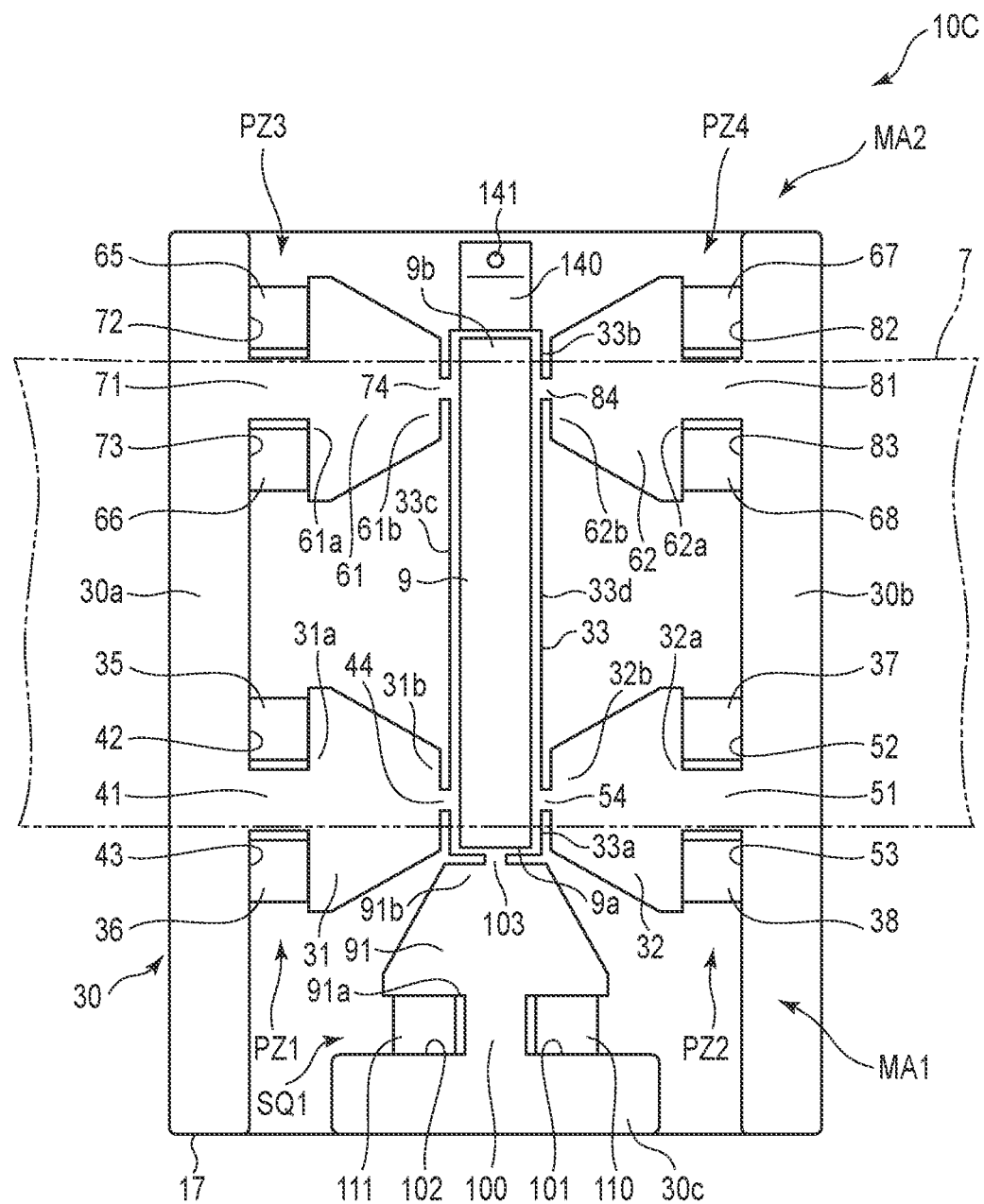
FIG. 9 is a plan view of the head driving device shown in FIG. 8.

Fourth Embodiment (FIG. 8 and FIG. 9)

FIG. 8 is a perspective view of a head driving device 10D of a fourth embodiment. FIG. 9 is a plan view of the head driving device 10D. The head driving device 10D includes a reinforcement member 140. The reinforcement member 140 is arranged between a second end portion 9b of a head member 9 in the length direction and a base member 17. That is, the head driving device 10D of the fourth embodiment includes the reinforcement member 140, instead of the second skew driving piezoelectric unit SQ2 shown in FIG. 4.

As shown in FIG. 8 and FIG. 9, one end of the reinforcement member 140 is connected to a head supporting member 33. The other end of the reinforcement member 140 is connected to the base member 17 by a fixing portion 141. This reinforcement member 140 supports the second end portion 9b of the head member 9. Since the other structures are common to the head driving device 10D of the fourth embodiment and the head driving device 10A of the first embodiment, explanations thereof are omitted by adding common reference numbers to common structural elements.

When the present invention is implemented, the specific mode of each of the elements constituting each head driving device can be modified in various ways. For example, the number of actuator assembly can be one or three or more. In addition, a data storage device comes in various forms as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head driving device moving a head member relative to tape as a recording medium, the head driving device, comprising:
a base member including a first frame portion and a second frame portion;
a head supporting member supporting the head member;
a first beam member arranged between the first frame portion and a side portion of the head supporting member and including a first base portion connected to the first frame portion and a first head side hinge portion connected to the side portion of the head supporting member;
a second beam member arranged between the second frame portion and another side portion of the head supporting member and including a second base portion connected to the second frame portion and a second head side hinge portion connected to the other side portion of the head supporting member;
a first piezoelectric unit including piezoelectric elements arranged in the first beam member;
a second piezoelectric unit including piezoelectric elements arranged in the second beam member;
a first end support beam arranged between a first end portion of the head member in a length direction and the base member; and
a first skew driving piezoelectric unit arranged in the first end support beam and comprising piezoelectric elements driving the head member.

2. The head driving device of claim 1, wherein the first skew driving piezoelectric unit comprises a pair of the piezoelectric elements arranged in a width direction of the head member.

3. The head driving device of claim 1, further comprising:
a second end support beam arranged between a second end portion of the head member in the length direction and the base member; and
a second skew driving piezoelectric unit arranged in the second end support beam and comprising piezoelectric elements driving the head member in a skew direction.

4. The head driving device of claim 3, wherein the second skew driving piezoelectric unit comprises a pair of the piezoelectric elements arranged in a width direction of the head member.

5. The head driving device of claim 1, further comprising:
a reinforcement member arranged between a second end portion of the head member in the length direction and the base member.

* * * * *